United States Patent [19]
Shahid

[11] Patent Number: 6,096,229
[45] Date of Patent: Aug. 1, 2000

[54] METHOD OF MAKING ALIGNMENT GROOVES IN AN OPTICAL CONNECTOR SUPPORT MEMBER

[75] Inventor: Muhammed A. Shahid, Snellville, Ga.

[73] Assignee: Lucent Technologies Inc., Murray Hill, N.J.

[21] Appl. No.: 09/126,294

[22] Filed: Jul. 30, 1998

[51] Int. Cl.$^7$ .................................................. B29D 11/00
[52] U.S. Cl. .............................. 216/2; 216/24; 264/1.25; 264/2.2; 264/2.5; 264/2.7
[58] Field of Search ......................... 216/2, 24; 264/1.25, 264/2.2, 2.5, 2.7; 385/147; 359/900

[56] References Cited

U.S. PATENT DOCUMENTS

| | | | |
|---|---|---|---|
| 4,818,058 | 4/1989 | Bonanni | 350/96.2 |
| 5,388,174 | 2/1995 | Roll et al. | 385/80 |
| 5,603,870 | 2/1997 | Roll et al. | 264/1.25 |
| 5,632,908 | 5/1997 | Shahid | 216/2 |
| 5,639,387 | 6/1997 | Shahid | 216/39 |

*Primary Examiner*—Randy Gulakowski
*Assistant Examiner*—Allan Olsen

[57] ABSTRACT

A method for making an optical connector support member. The method can be broadly summarized by the following steps: One or more features are partially etched in a monocrystalline substrate to form a template. The features are etched in the substrate to a depth necessary to form the functional portions of the features. An inverse replica is created and then separated from the template. Additional material is bonded to the inverse replica in the regions that correspond to the features that were partially etched in the monocrystalline substrate. The inverse replica with the additional material bonded thereto is then used as a pattern for making a support member. A multi-fiber support member made using the inverse replica described in the foregoing will have one or more features formed therein that correspond to the features etched in the monocrystalline substrate, but are deeper because of the additional material that was bonded to the inverse replica.

21 Claims, 4 Drawing Sheets

METHOD OF MAKING ALIGNMENT GROOVES IN AN OPTICAL CONNECTOR SUPPORT MEMBER

BACKGROUND OF THE INVENTION

The present invention relates generally to the field of optical fiber connectors, and, more particularly, to an improved method of making V-groove plastic support members for use in optical connectors, including multi-fiber optical connectors.

With the demand for high speed, multi-media services constantly increasing, optical fibers are gaining increased attention as communication service providers design their networks to carry high bandwidth signals. Unfortunately, the precision required in connecting optical fibers together precludes the practice of bundling large numbers of fibers in a single cable as is frequently practiced with copper wires. Instead, fibers are generally organized in a precise, spatial relationship, such as in a ribbon cable, in which the fibers are organized and molded adjacent to one another in a plastic ribbon. Alignment of such fiber arrays either with other arrays or with optical components can be troublesome, especially for the case of single mode fibers, which have an extremely small core diameter (typically around 8 $\mu$m).

The multi-fiber connectors used to interconnect fiber arrays typically comprise two plugs of silicon or plastic molded from a silicon template with V-grooves formed therein to seat the individual fibers and alignment pins. Each plug is made from two mated support members that are bonded together to encase the fibers. If the plug is made from silicon, the V-grooves are formed prior to bonding by anisotropically etching a major surface of each support member to match the spatial relationship of the fibers in the array. If the plug is made from plastic, a silicon template is anisotropically etched to form V-grooves corresponding to the fiber array pattern. This template is then used to create a mold insert from which plastic support members can be produced having the necessary arrangement of V-grooves.

Monocrystalline materials, such as silicon, are used in manufacturing support members for optical connectors because etching of these materials inherently progresses along crystallographic planes, which permits features to be formed with precise predictability. In the production of V-groove features in a silicon wafer or substrate, the wafer is coated with a thin (i.e., ~1 $\mu$m thick) layer of a first masking material on both of its major surfaces. The first masking layers may be fabricated, for example, from silicon dioxide or silicon nitride. After the first masking layer has been applied, a conventional photoresist mask is applied, which forms a second masking layer over the silicon. Conventional photolithographic techniques are used to create a pattern of windows in the photoresist in the first major surface of the wafer. After etching the first masking layer to expose the silicon wafer through the pattern of windows, the photoresist is removed. A first masking layer fabricated from silicon dioxide may be etched with a buffered hydrofluoric acid solution. During the oxide etching process on the first major surface, the second major surface is protected by a second masking layer of photoresist, which is stripped after the oxide etching process. Once the photoresist and first masking layer have been etched, the photoresist is stripped from the wafer and the wafer is anisotropically etched with an ethylene diamine pyrocatechol solution to create the desired V-grooves through the windows in the first masking layer. Lastly, the first masking layer is stripped, and the wafer is sectioned into individual V-groove submounts. The silicon exposed through the windows in the first masking layer is typically anisotropically etched to create the desired features (e.g., the V-grooves) that lie in the wafer vicinal (100) crystal plane. Preferably, the V-grooves are aligned parallel to the <110> direction. The planar facets bounding the V-grooves lie within {111} planes that are inclined with respect to the (100) plane at an angle of 54.74°. Similarly, using silicon nitride as the first masking layer, a solution of KOH in water can be used to create the same V-groove features.

One common approach to ensuring a precise alignment between fiber arrays is to etch deeper V-grooves in the silicon surface to serve as alignment grooves. These grooves are used to seat alignment pins or rods or ball lenses or ball bearings that join two connectors together. For the alignment pins or ball bearings to be effective, however, precise control over the placement and the dimensions of the alignment grooves must be maintained during etching. For example, an optical connector may be designed with fiber support members that require lateral symmetry with respect to a center of symmetry be maintained. During the etching process of masked silicon wafers, control over lateral symmetry is most frequently lost when etching the deeper V-grooves that are used for the alignment pins. In addition to compromising the lateral symmetry of the multi-fiber connector, the alignment grooves require significantly more time to etch than the V-grooves holding the individual fibers. Typically, alignment grooves are over six times as deep as the V-grooves holding the fibers thus requiring over four to six times as much time to etch.

Consequently, there is a need for an improved method for producing optical connector support members that provides greater control over the placement and dimensions of etched features (e.g., alignment V-grooves). It is further desired that the improved method use less etching time than has been required heretofore to produce similarly styled connectors.

SUMMARY OF THE INVENTION

Certain advantages and novel features of the invention will be set forth in the description that follows and will become apparent to those skilled in the art upon examination of the following or may be learned with the practice of the invention.

To achieve the advantages and novel features, the present invention is generally directed to a method for making an optical connector support member. The method can be broadly summarized by the following steps: One or more features are partially etched in a monocrystalline substrate to form a template. An inverse replica is created and then separated from the template. Additional material is bonded to the inverse replica in the regions that correspond to the features that were partially etched in the monocrystalline substrate. The inverse replica with the additional material bonded thereto is then used as a pattern for making a support member according to the present invention. A support member made using the inverse replica described in the foregoing will have one or more features formed therein that correspond to the features etched in the monocrystalline substrate, but are deeper.

In accordance with one aspect of the invention, the feature is an alignment groove and the depth to which the monocrystalline substrate is partially etched is determined as follows: A first depth is determined that equals the depth at which an alignment pin would engage the side walls defining the boundaries of one of the alignment grooves. This first depth represents the functional portion of the alignment grooves. A safety margin is added to the first depth to obtain a second depth to ensure that the substrate is not insufficiently etched. Finally, the monocrystalline substrate is etched until reaching the second depth thus ensuring that the functional portion of the alignment grooves is precisely formed.

In accordance with another aspect of the invention, the material bonded to the inverse replica is dimensioned to ensure that the alignment grooves formed in the support member have a depth that will accommodate (i.e., provide adequate clearance for) an alignment pin, alignment ball bearing or alignment ball lens.

In accordance with yet another aspect of the present invention and in an illustrative embodiment thereof, the monocrystalline substrate comprises silicon while the inverse replica comprises nickel.

The invention can also be viewed as providing a pattern for making a support member. In this regard, the pattern comprises an inverse replica that is made from a monocrystalline substrate that has one or more features partially etched therein. The inverse replica has one or more ridges formed thereon that correspond to the features partially etched in the monocrystalline substrate. The inverse replica further comprises material bonded on the ridges such that the support member made from the inverse replica has one or more features formed therein corresponding to the features etched in the monocrystalline substrate. Because of the material bonded on the ridges of the inverse replica, however, the features in the multi-fiber support member are deeper than the features in the monocrystalline substrate.

In accordance with an aspect of the present invention, the feature is an alignment groove and the material bonded to the ridges of the inverse replica is dimensioned to ensure that the alignment grooves in the multi-fiber support member have a depth that will accommodate an alignment pin.

In general, the present invention exploits the reality that only a portion of a feature in a support member or other part derived from an etched monocrystalline substrate actually has a functional purpose (e.g., engages an alignment pin in the case of an alignment V-groove). Accordingly, only the functional portion of the feature requires the precision that photolithographic etching provides. The non-functional portion of the feature groove can be formed using less precise techniques as long as a sufficient depth is reached to provide adequate clearance for any member to be received in the feature.

The method and pattern according to the present invention have many advantages, a few of which are set forth hereafter as examples.

One advantage of the present invention is that it provides more control over the placement, dimensions, and symmetry (or asymmetry, if desired) of etched features in a monocrystalline substrate used as a template for producing parts such as optical connector support members.

Another advantage of the present invention, is that the time involved in etching the features in a substrate is also reduced. For example, to etch an alignment groove that can accommodate a typical alignment pin having a diameter of approximately 350 μm, as much as six to eight hours of etch time can be saved.

Still another advantage of the present invention is that parts, such as optical connector support members can be produced much more cost effectively because of the aforementioned reduction in etch time and the improvement in quality (i.e., the parts have fewer misplaced or misaligned features).

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENT

Figure 1:
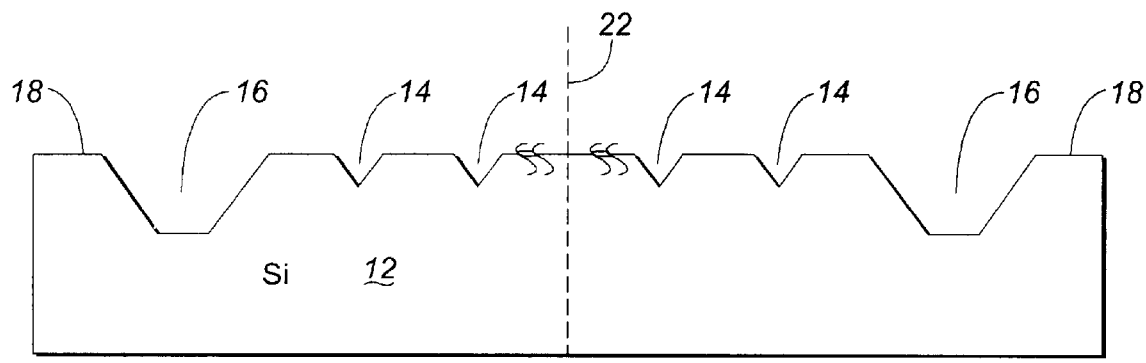
FIG. 1 is a cross-sectional view of an etched monocrystalline substrate that illustrates the arrangement and dimensions of fiber and alignment V-grooves in a substrate.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

A monocrystalline substrate or wafer 12 that is exemplary of a prior art template used for producing plastic, support members for use in multi-fiber optical connectors is shown in FIG. 1. For the purpose of teaching the concepts of the present invention, substrate or wafer 12 is assumed to comprise silicon. Nevertheless, alternative monocrystalline materials, such as Ge, GaAs, InP, and CdTe can be used to practice the present invention with equal success. Silicon substrate 12 includes both fiber V-grooves 14 and alignment V-grooves 16 etched into its upper surface 18, which corresponds to the (100) crystal plane. The etching process was discussed briefly hereinbefore; however, greater detail is provided in the following U.S. Pat. No. 5,639,387 to Shahid, U.S. Pat. No. 5,632,908 to Shahid, U.S. Pat. No. 4,998,796 to Bonanni et al., and U.S. Pat. No. 4,818,058 to Bonanni, each of which is incorporated herein by reference. During the etching process, it is critical that the placement and dimensions of etched features be precisely controlled. In the example shown in FIG. 1, lateral symmetry must be maintained for alignment grooves 16 with respect to a center of symmetry 22. Otherwise, the fibers held in a connector having support members generated from substrate 12 will not precisely register with corresponding fibers held in a mating connector or, if the loss in lateral symmetry is severe, the two connectors will not mate at all.

Figure 2:
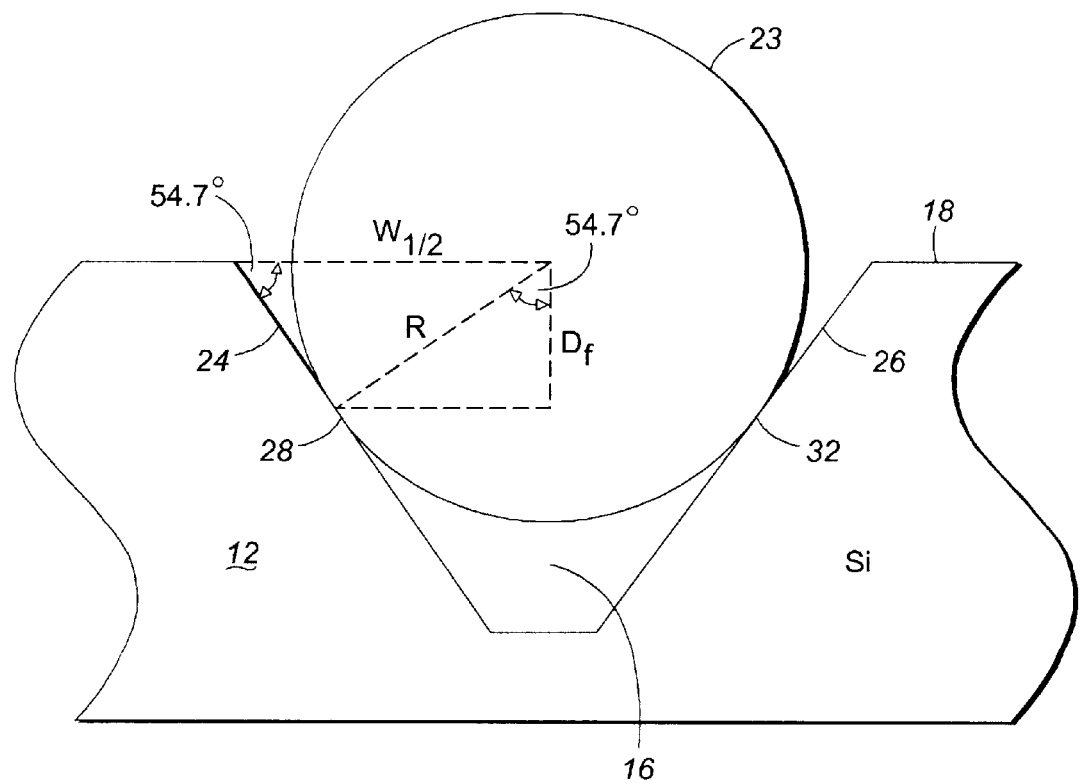
FIG. 2 is a cross-sectional view showing an alignment pin at rest in one of the alignment V-grooves shown in FIG. 1.

Unfortunately, the likelihood of losing lateral symmetry increases as the etch depth increases. Thus, while alignment pins and alignment grooves in a multi-fiber connector are intended for improving the alignment of a fiber array with a complementary fiber array, the opposite effect may, in fact, occur. FIG. 2 shows an alignment pin 23 resting in a traditionally formed alignment V-groove 16. A common cross-sectional radius for alignment pin 23 is approximately 350 μm. To accommodate an alignment pin 23 of this size, alignment V-groove 16 would normally be etched to a depth of approximately 400 μm. By contrast, the cross-sectional radius of a commercial communication grade optical fiber is on the order of 62.5 μm, thus requiring an etch depth for fiber V-grooves 14 (see FIG. 1) of approximately 75 μm. Silicon can be etched parallel to the [110] direction, i.e., along the depth of (100) Si surface, at a rate of approximately 25 μm–30 μm per hour. Using these numbers, it takes approximately three hours to etch fiber V-grooves 14 while alignment V-grooves 16 take more than twelve hours to etch. It is during such prolonged periods of etching that the lateral symmetry of alignment V-grooves 16 can be lost. Moreover, the deep etch depths used to form alignment V-grooves 16 frequently require multiple photolithographic masking levels and steps, which tends to cause loss of control of lateral symmetry in the alignment V-grooves 16.

Referring to FIG. 2, it is easy to see that alignment V-groove 16 is etched substantially deeper than is necessary to fulfill its functional role. That is, the planar facets 24 and 26 bounding alignment V-groove 16 contact alignment pin 23 at points 28 and 32. The portion of alignment V-groove 16 beneath contact points 28 and 32 has no effect on the lateral symmetry of alignment V-groove 16. The only requirement for this region is to provide sufficient clearance for alignment pin 23.

Thus, the depth to which silicon substrate 12 must be etched to ensure precise lateral symmetry for alignment groove 16 is labeled as $D_f$ in FIG. 2. The radius of alignment pin 23 is labeled as R. As discussed hereinbefore, for silicon, the angle formed between the surface plane (100) and the {111} facets 24 and 26 is 54.74°. Furthermore, it can be shown that the angle between lines $D_f$ and R is also 54.74°. It then follows that $D_f$ is given by Equation 1 set forth below:

$$D_f = R \cos(54.74°) \qquad \text{EQ. 1}$$

Under these conditions, the half-width of the V-groove is $W_{1/2} = R/\sin(54.74°)$. Following the same example discussed in the foregoing, if alignment pin 23 has a radius of 350 μm, the depth $D_f$ to which silicon substrate 12 must be etched to form the functional portions of facets 24 and 26 is 202 μm. Under these conditions, the half-width of the V-groove is 428.64 μm. To provide a safety margin, an additional 48 μm can optionally be added to this depth.

With reference now to FIGS. 3A through 3E, an improved method for making alignment grooves in a multi-fiber support member for use in an optical connector will be described hereafter. It should be understood, however, that the techniques taught herein can be applied to produce a multi-fiber support member having any desired number of alignment V-grooves. Furthermore, the invention is also applicable to producing support members having a single alignment groove to encase and align a single optical fiber. In addition to alignment grooves in an optical fiber support member, the principles of the invention can be applied to the formation of any feature that involves etching of a monocrystalline substrate to depths deeper than are necessary to form the portions or regions of the feature in which high precision is required.

The process begins by determining the depth $D_f$ at which the alignment pin will engage facets or side walls 24 and 26 bounding the alignment V-groove as discussed with reference to FIG. 2. A safety margin is then added to this depth to provide a total etch depth value of $D_{f+s}$. Silicon substrate 12 is then etched using standard etching procedures to a depth of $D_{f+s}$. Following the example begun with reference to FIG. 2, an etch depth $D_{f+s}$ of approximately 250 μm is used to form a V-groove of correct width and bounded by facets 24 and 26 for accommodating an alignment pin with a radius of 350 μm. Note that 202 μm of the 250 μm represents $D_f$ with the remaining 48 μm providing a safety margin. Advantageously, because the alignment V-grooves are only partially etched (i.e., to a depth $D_{f+s}$), both the alignment V-grooves and the V-grooves holding the fibers (not shown) can be etched using a simplified single level mask processing instead of multiple level mask processing.

Figure 3A:
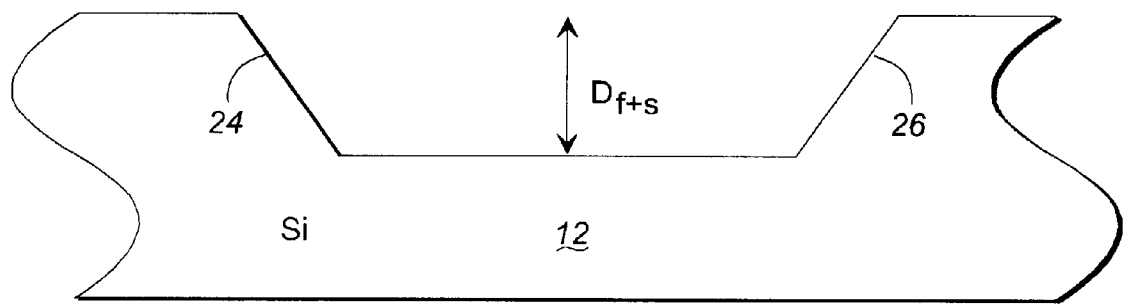
FIG. 3A is a cross-sectional view of a silicon substrate having an alignment V-groove etched in accordance with the principles of the present invention.
Figure 3B:
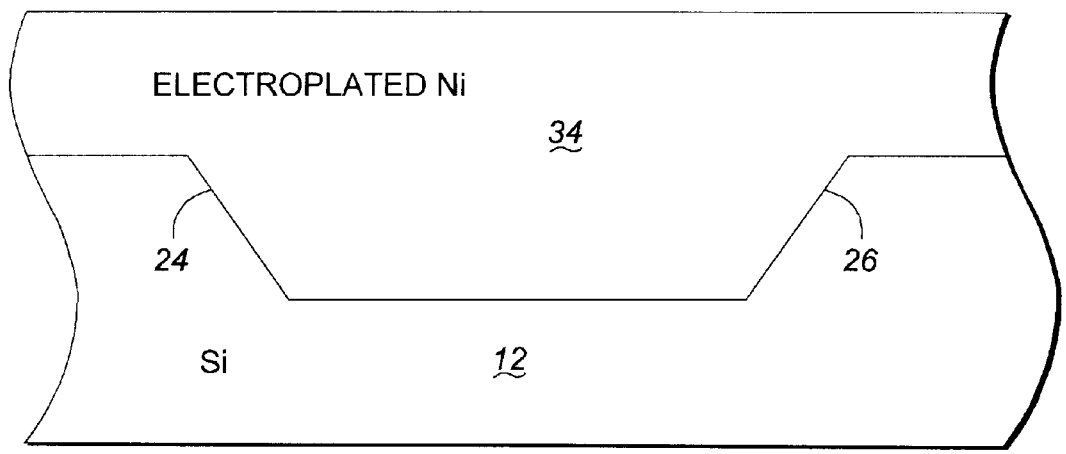
FIG. 3B is a cross sectional view of the etched silicon substrate of FIG. 3A having been electroplated with nickel.

Once etching is complete, silicon substrate 12 is used as a template or pattern for making optical connector support members. As shown in FIG. 3B, the etched silicon substrate 12 is electroformed with nickel or another material of suitable hardness to form an inverse replica 34 of the alignment V-grooves and the fiber V-grooves (not shown). The number, lateral positioning, and dimensions of the fiber V-grooves and the alignment V-grooves are design parameters that will typically be chosen to correspond to the type of multi-fiber connector to be manufactured. While electroforming the etched silicon template 12 with nickel is used in the preferred embodiment to form replica 34, other techniques, such as electroplating, chemical vapor deposition, or electroless plating, can alternatively be used.

Figure 3C:
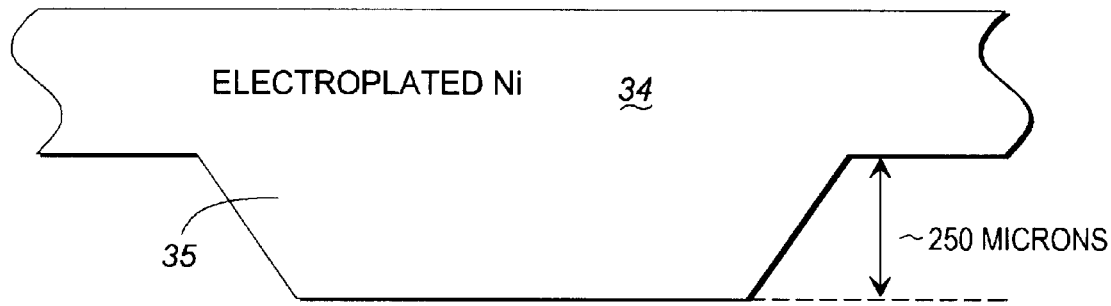
FIG. 3C is a cross sectional view of the electroformed nickel block of FIG. 3B that is an inverse replica of the etched silicon substrate of FIG. 3A.

After electroforming, the entire silicon template 12 is etched away using, for example, a mixture of KOH and water (other known etchants of silicon could likewise be used), thereby leaving the inverse replica 34 shown in FIG. 3C. Inverse replica 34 comprises ridges 35 corresponding to the alignment V-grooves (a single truncated alignment V-groove is depicted in FIG. 3C) and the fiber V-grooves. It is important to remember that at this stage in the process, the ridges 35 in replica 34 corresponding to the alignment V-grooves are not dimensioned large enough to produce alignment V-grooves that will accommodate the alignment pins. Recall from the discussion of FIG. 3A that the silicon substrate 12 was etched only to a depth sufficient to form the functional portions of facets 24 and 26 plus an additional safety margin. Nevertheless, because the additional depth required in the alignment V-grooves to accommodate the alignment pins does not affect the lateral symmetry or any of the critical dimensions of the alignment V-grooves, it can be provided outside of the etching process.

Figure 3D:
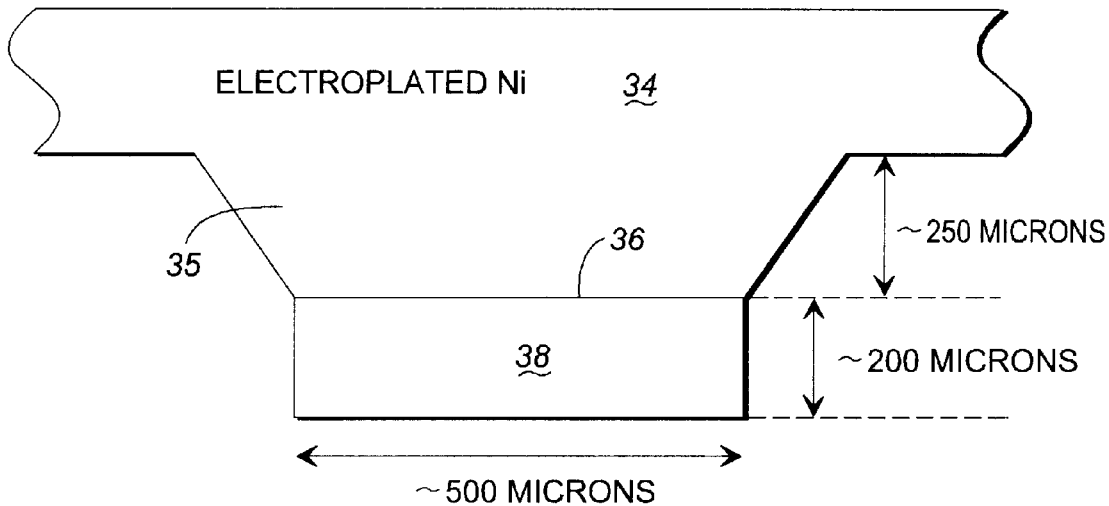
FIG. 3D is a cross sectional view of the electroformed nickel block of FIG. 3C with additional material added to a ridge corresponding to the alignment groove of FIG. 3A in accordance with a first illustrative embodiment of the present invention.
Figure 3E:
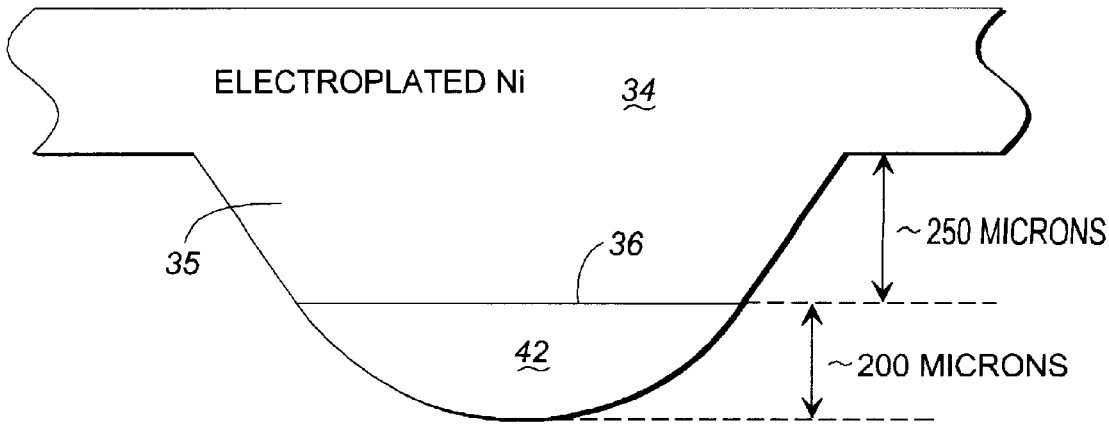
FIG. 3E is a cross sectional view of the electroformed nickel block of FIG. 3C with additional material added to a ridge corresponding to the alignment groove of FIG. 3A in accordance with a second illustrative embodiment of the present invention.

FIGS. 3D and 3E depict two examples for modifying the alignment V-groove ridges of replica 34 to accommodate the alignment pins. In FIG. 3D a block 38 of nickel material is bonded through micro-welding, for example, to horizontal facet 36 to form the bottom of the alignment V-grooves produced from this replica such that the alignment pins seat properly within the groove (i.e., they rest on the side walls of the V-groove corresponding to facets 24 and 26 of FIGS. 3A and 3B). Instead of a block 38 of additional nickel material, FIG. 3E illustrates an alternative embodiment in which the additional nickel material 42 has a curvature that approximates the curvature of an alignment pin to be held in the generated alignment V-groove. These two examples are presented for illustrative purposes only. The additional material can be added in any shape or form as long as the dimension or design is chosen to provide adequate clearance for an alignment pin. Referring back to the example begun in FIG. 2, to accommodate an alignment pin having a 350 µm radius, the alignment V-groove depth should reach at least 400 µm. Thus, the additional nickel material 38 and 42 of FIGS. 3D and 3E are shown to be approximately 200 µm thick to produce alignment V-grooves having depths at least 450 µm.

Finally, the replicas shown in FIGS. 3D and 3E with added material 38 and 42 are used as a pattern for making optical connector support members according to the present invention. For example, the replicas of FIGS. 3D and 3E can be machined and used as an insert in a mold from which support members can be produced by injection molding. It is customary to oversize the etched silicon template (see FIG. 3A), and, as a result, replica 34 to compensate for some amount of shrinkage in the molded plastic components. The conversion of replica 34 into an insert for use in injection molding is taught in U.S. Pat. Nos. 5,388,174 and 5,603,870 to Roll et al., both of which are incorporated herein by reference. Alternative manufacturing techniques such as compression molding or die stamping can also be used to produce the support members. All of these manufacturing techniques enjoy a significant cost advantage over making the parts from silicon or another monocrystalline material through photolithographic masking and etching.

The foregoing description describes an improved method for making alignment V-grooves in an optical connector support member. It should be understood, however, that the manufacture of optical connector support members is just one application that can benefit from the invention disclosed herein. The foregoing method is generally applicable to the situation in which a feature or set of features must be etched into a monocrystalline substrate, but one or more of the features must be etched to a depth that is deeper than is required to fulfill the functional portion of the feature. The functional portion of the feature is that portion in which control over placement, dimension, and symmetry is critical and should therefore be formed using a precision technique, such as photolithographic etching and masking.

Figure 4A:
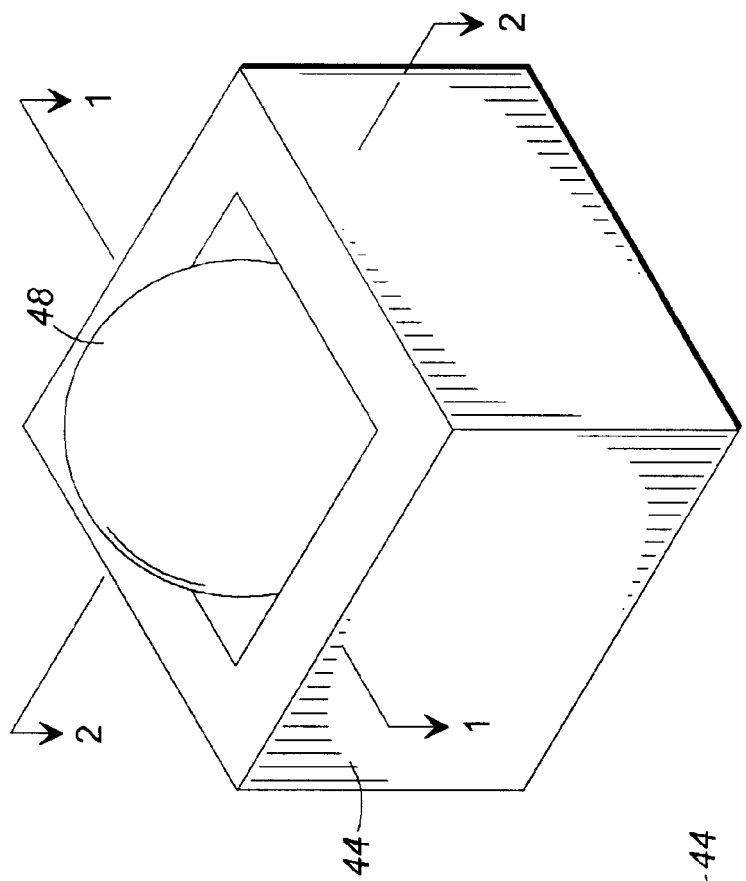
FIGS. 4A and 4B depict a part that includes a square, pyramidal shaped feature for receiving a sphere that is produced from the method according to the present invention.
Figure 4B:
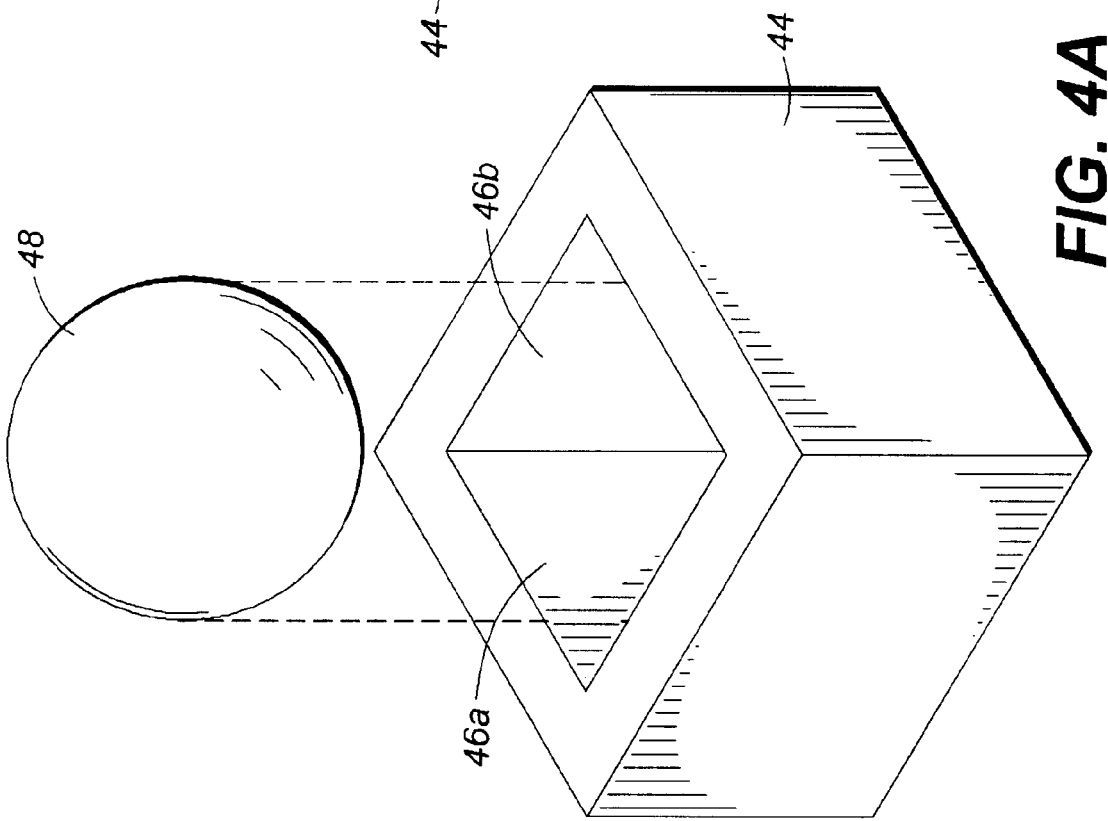

Thus, FIGS. 4A and 4B demonstrate an alternative application for the method according to the present invention in which a part 44 is produced having a square, pyramidal feature formed therein. As a square or rectangle is etched into the surface of a silicon substrate to form a template, the four side walls formed as part of the etching process will proceed at an angle of 54.74° with respect to the surface as discussed earlier with regard to the etching of V-grooves. Two side walls 46a and 46b produced from the walls etched in the template are shown in FIG. 4A. Because of the angle formed between the etched side walls and the surface of the silicon substrate, the walls will meet at an apex (not shown) thereby forming an inverted pyramid shape. To support a sphere or ball lens 48, it will frequently be unnecessary to etch the side walls in the template from which walls 46a and 46b are formed to the point where the walls meet at the apex. Often, the apex will be substantially deeper than the points on the side walls that engage sphere 48 when it is received in the square aperture as shown in FIG. 4B. Cross-sections taken along 1—1 or 2—2 would be similar to those shown in FIG. 2. Therefore, similar design analysis will be required. Accordingly, the silicon substrate need only be etched to a depth necessary to form the functional portions of the side walls that would engage sphere 48. The remainder of the square, pyramidal aperture can be formed by modifying the replica generated from the silicon substrate to provide adequate clearance for the sphere 48 in molded part 44 as taught hereinbefore with regard to the formation of alignment V-grooves in optical connector support members.

From this description, it can readily be seen that the improved method according to the present invention uses significantly less time to etch features into a monocrystalline (e.g., silicon) substrate or wafer than prior art techniques because only the functional portion of the features plus a safety margin are etched. In addition to reducing etch time, the method also reduces the likelihood of losing control over placement, dimension, or symmetry of the features because of the shallower etch depth and shorter etch time.

In concluding the detailed description, it should be noted that it will be obvious to those skilled in the art that many variations and modifications can be made to the preferred embodiment without substantially departing from the principles of the present invention. For example, with reference to FIG. 2, the center of the alignment pin may be raised above the (100) planar surface facet somewhat. This may require even narrower grooves and even shallower depths than those shown in FIG. 2. All such variations and modifications are intended to be included herein within the scope of the present invention, as set forth in the following claims.

I claim:

1. A method for making an optical connector support member, comprising the steps of:

partially etching at least one feature in a monocrystalline substrate to form a template;

creating an inverse replica from said template;

separating said inverse replica from said template;

bonding material to said inverse replica in regions corresponding to said at least one feature; and using said inverse replica as a pattern for making the support member, the support member having at least one feature formed therein corresponding to said at least one feature etched in said monocrystalline substrate, the at least one feature in the support member being deeper than said at least one feature in said monocrystalline substrate.

2. The method of claim 1, wherein said monocrystalline substrate is silicon.

3. The method of claim 1, wherein said feature is an alignment groove.

4. The method of claim 3, wherein said partially etching step comprises the steps of:

determining a first depth at which an alignment pin would engage side walls bounding said at least one feature;

adding a safety margin to said first depth to obtain a second depth; and etching said at least one feature in said monocrystalline substrate until reaching said second depth, said second depth being shallower than that required to accommodate the alignment pin.

5. The method of claim 3, wherein said partially etching step is performed using a single level mask processing.

6. The method of claim 3, wherein said material is bonded to form the at least one feature in the support member with a depth sufficient to accommodate an alignment pin.

7. The method of claim 1, wherein said inverse replica comprises nickel.

8. The method of claim 1, wherein said inverse replica is created through electroforming.

9. The method of claim 1, wherein said inverse replica is created through electroplating.

10. The method of claim 1, wherein said inverse replica is created through chemical vapor deposition.

11. The method of claim 1, wherein said inverse replica is created through electroless plating.

12. The method of claim 1, wherein said using step comprises the steps of:

machining said inverse replica;

inserting said machined inverse replica into a mold; and applying plastic material to said mold to make the support member.

13. The method of claim 12, wherein said at least one feature in said monocrystalline substrate is oversized to compensate for shrinkage in said plastic material comprising the support member.

14. The method of claim 12, wherein said applying step is implemented through injection molding.

15. The method of claim 12, wherein said applying step is implemented through compression molding.

16. The method of claim 12, wherein said applying step is implemented through die stamping.

17. A method for making a part having at least one feature formed thereon, comprising the steps of:

partially etching the at least one feature in a monocrystalline substrate corresponding to the at least one feature in the part to form a template;

creating an inverse replica from said template;

separating said inverse replica from said template;

bonding material to said inverse replica in regions corresponding to the at least one feature; and using said inverse replica as a pattern for making the part, the at least one feature in the part being deeper than said at least one feature in said monocrystalline substrate.

18. A pattern for making an optical connector support member, comprising:

an inverse replica of a monocrystalline substrate having at least one feature partially etched thereon;

said inverse replica having at least one ridge formed thereon corresponding to said at least one feature; and material bonded on said at least one ridge such that the support member made from said inverse replica has at least one feature formed therein corresponding to said at least one feature etched in said monocrystalline substrate, the at least one feature in the support member being deeper than said at least one feature in said monocrystalline substrate.

19. The pattern of claim 18, wherein said inverse replica comprises nickel.

20. The pattern of claim 18, wherein said feature is an alignment groove.

21. The pattern of claim 20, wherein said material is dimensioned to form the at least one feature in the support member with a depth sufficient to accommodate an alignment pin.

* * * * *